Figure 14:
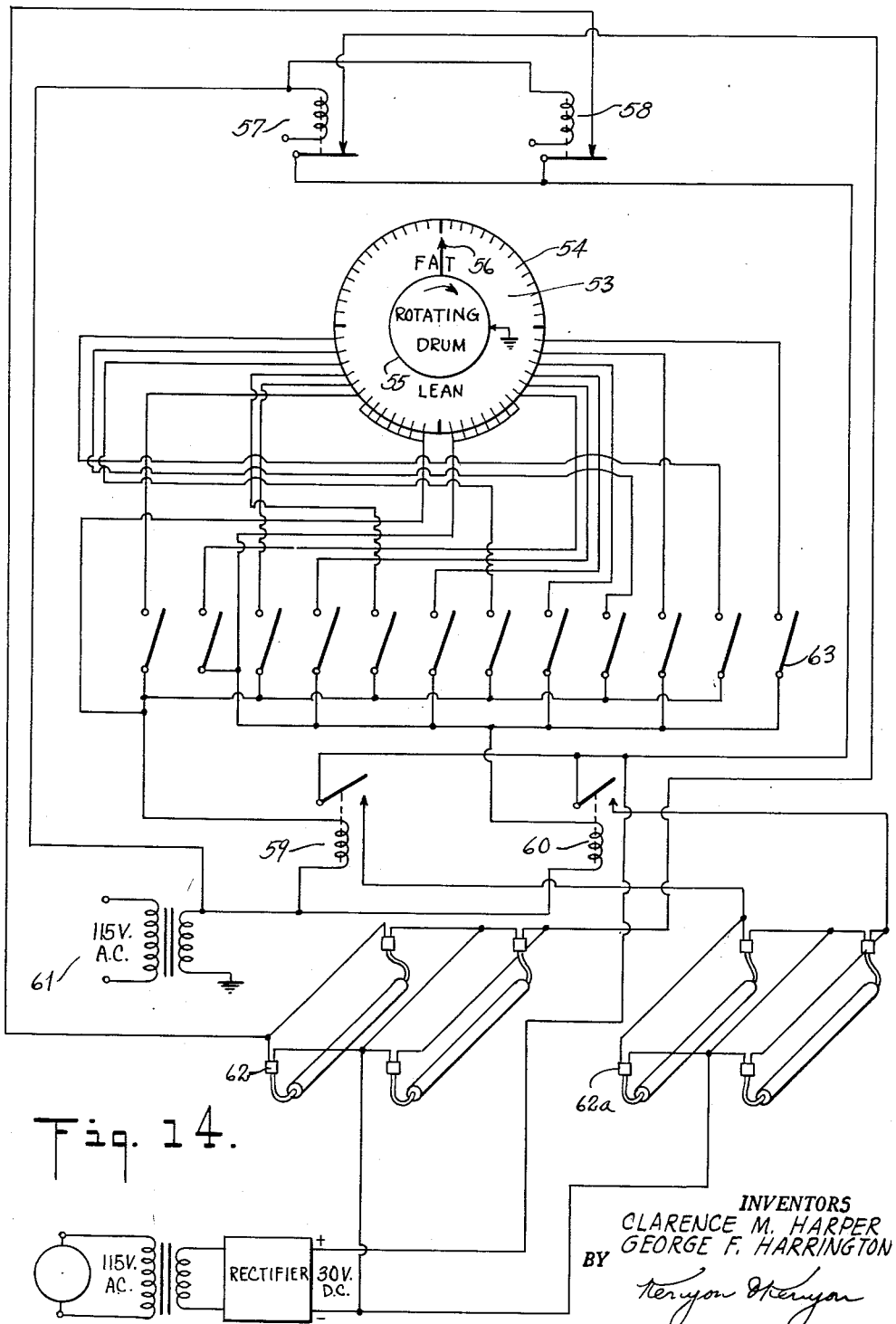

Jan. 9, 1962 C. M. HARPER, JR., ETAL 3,016,004
MEAT TREATING
Filed Jan. 26, 1960 5 Sheets-Sheet 1
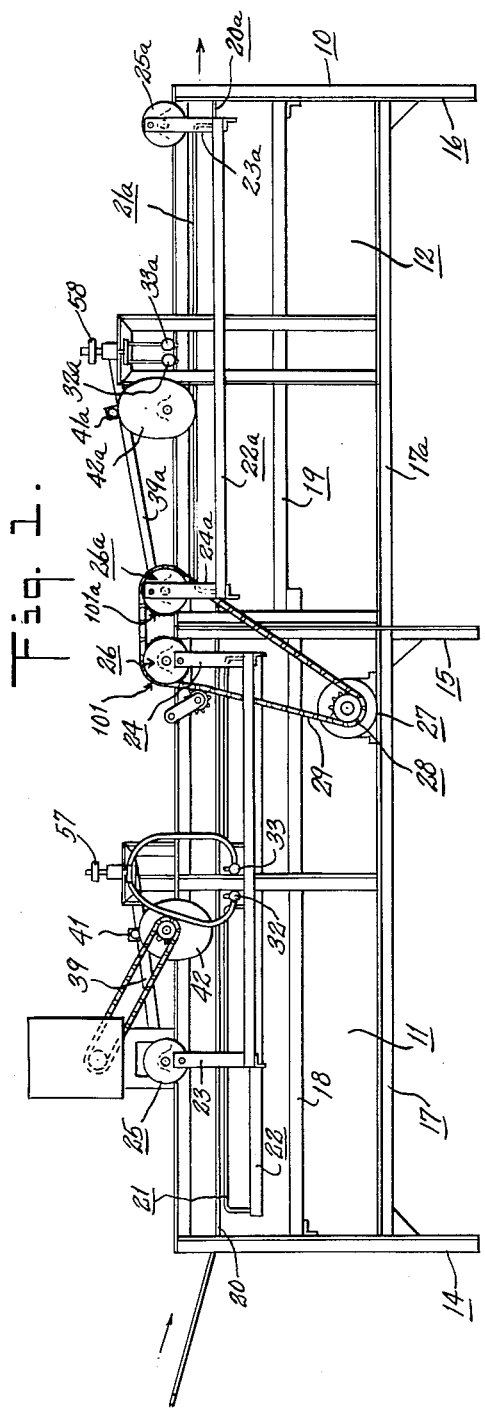
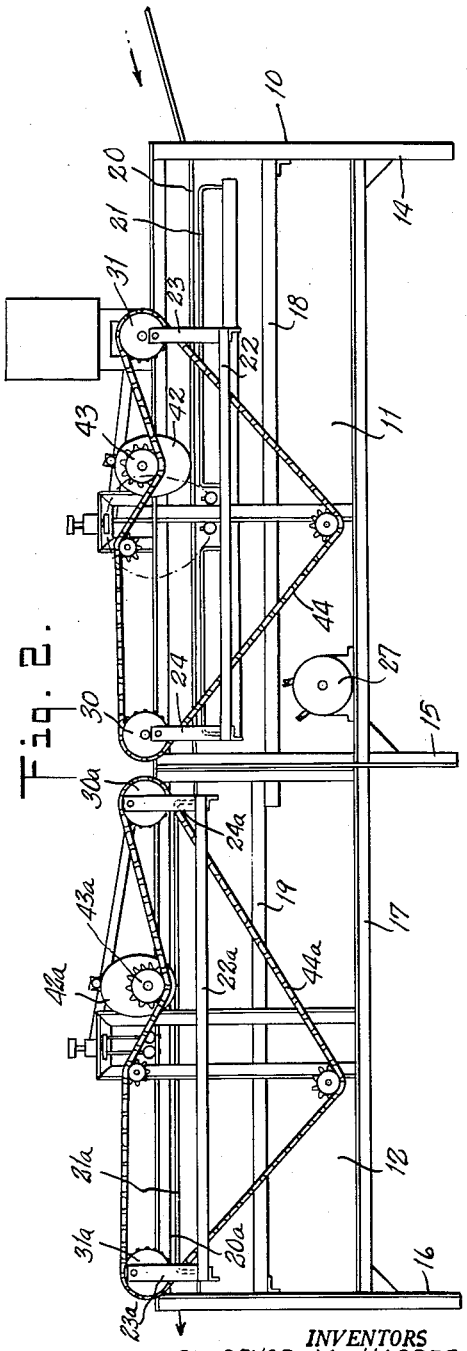
INVENTORS
CLARENCE M. HARPER
GEORGE F. HARRINGTON
BY
Kenyon & Kenyon
ATTORNEYS

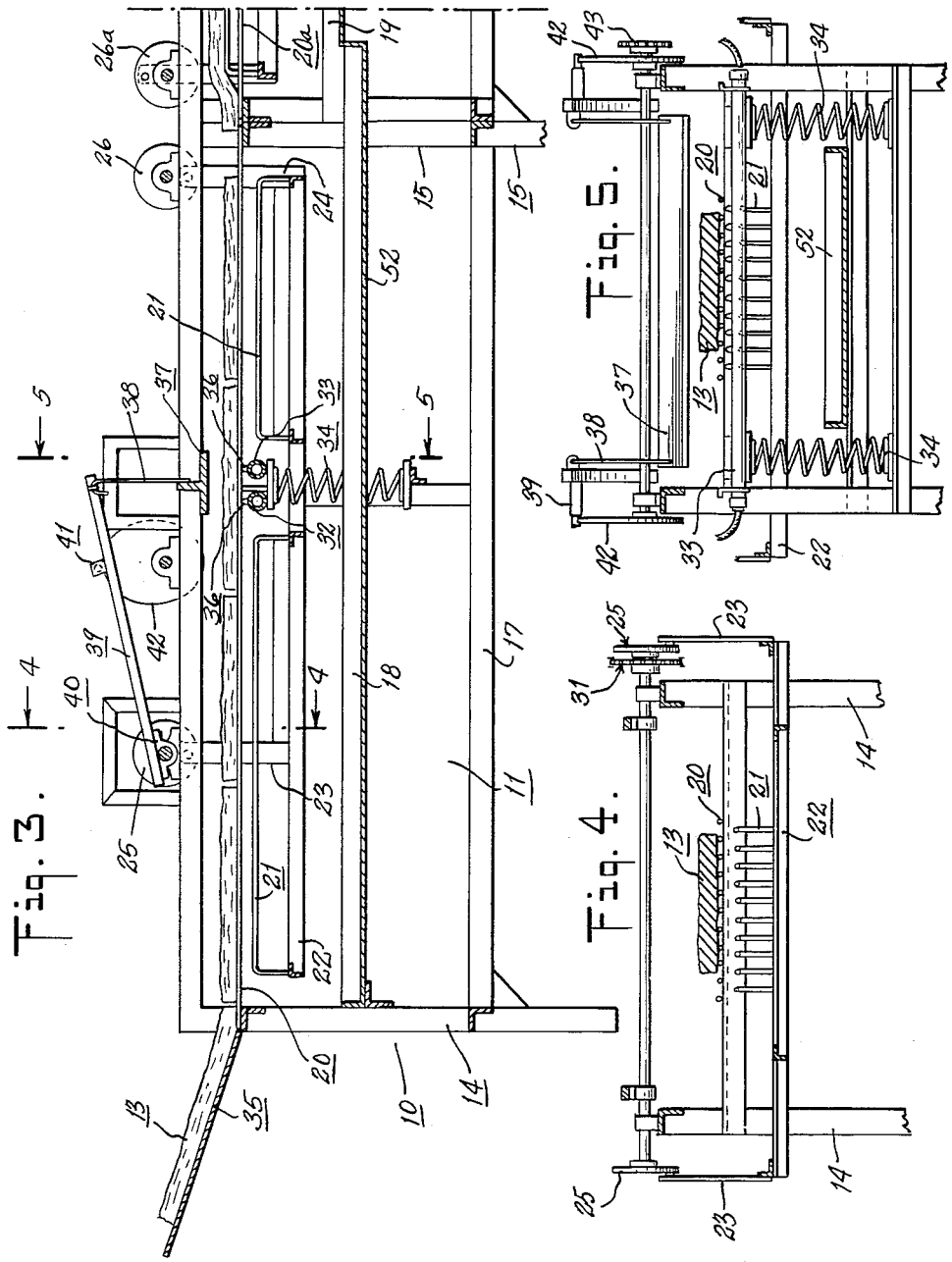

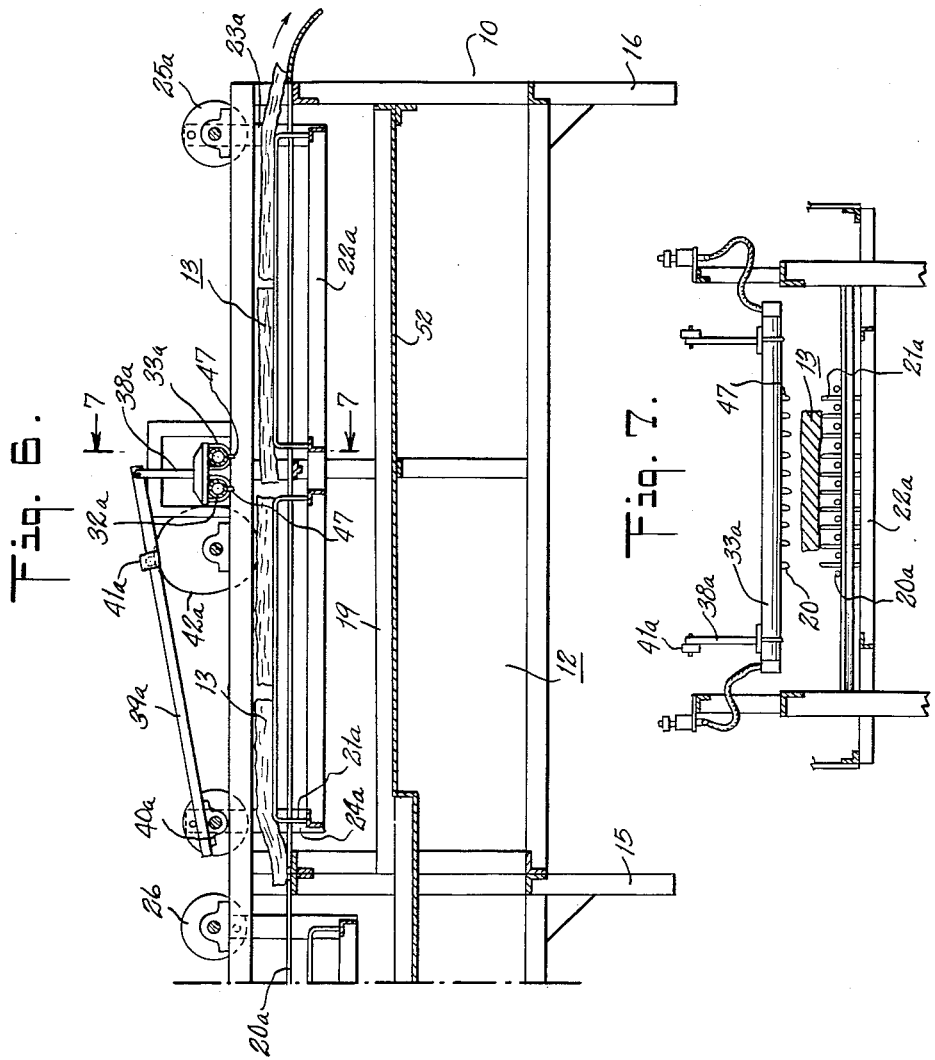

Jan. 9, 1962 C. M. HARPER, JR., ETAL 3,016,004
MEAT TREATING
Filed Jan. 26, 1960 5 Sheets-Sheet 4
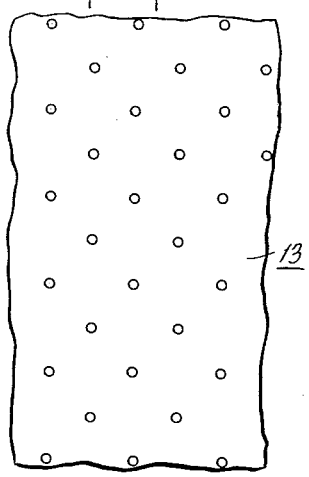
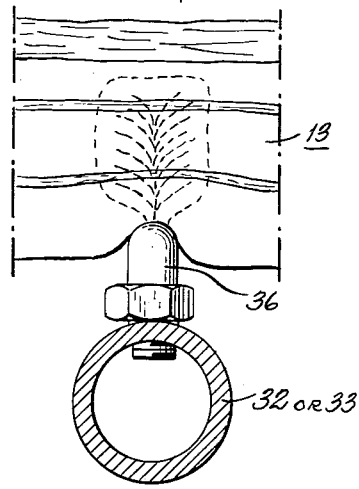
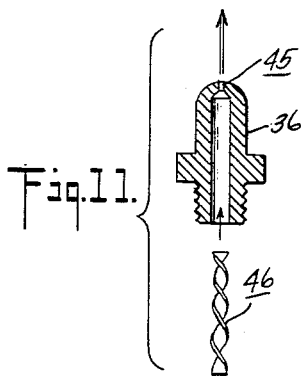
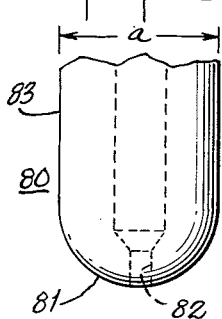
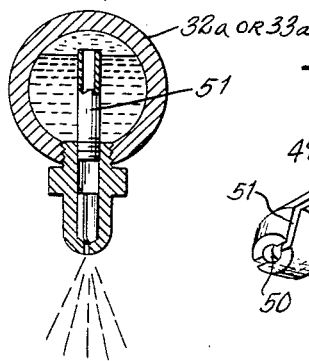
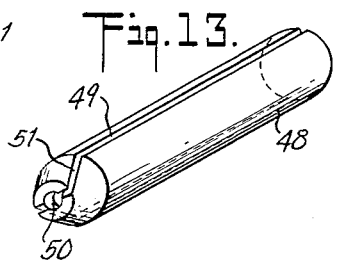
INVENTORS
CLARENCE M. HARPER
GEORGE F. HARRINGTON
BY
Kenyon & Kenyon
ATTORNEYS INVENTORS
CLARENCE M. HARPER
GEORGE F. HARRINGTON
BY
Kenyon & Kenyon
ATTORNEYS United States Patent Office 3,016,004
Patented Jan. 9, 1962

3,016,004
MEAT TREATING
Clarence Michael Harper, Jr., Speedway, and George Fox Harrington, Indianapolis, Ind., assignors to Hygrade Food Products Corporation, Detroit, Mich., a corporation of New York
Filed Jan. 26, 1960, Ser. No. 4,788
11 Claims. (Cl. 99—255)

This invention relates generally to a method for introducing liquids into meat products and relates also to a machine utilizing said method and adapted to automatically inject a curing solution into both the lean and fat sides of bacon bellies.

In the processing and curing of meat products and in the meat industry in general, it is common practice to cure the meat by introducing a liquid into the meat during processing and prior to smoking and chilling. The liquid introduced into the meat is commonly referred to as curing pickle and the purpose of this pickle is to cure the meat, enhance its flavor and improve its color. The pickle also acts as a preservative by retarding bacteria growth.

The introduction of curing solution into bacon bellies, corned beef and many other meat products has been a particularly vexatious problem in the meat processing industry. The practice prior to this invention for curing meat products of this type was to inject the curing pickle into the center of the meat product by introducing a needle, for example. This often results in inferior distribution of curing pickle throughout the meat. In addition, after the injection of curing pickle, the meat is preferably held for a period of 24 to 48 hours before further processing in order to allow the curing pickle to disperse throughout the meat.

In view of the foregoing, an object of the present invention is to provide a method for injecting liquid into meat which will result in superior distribution of said liquid in the meat so treated.

Another object of this invention is to provide an automatic injection machine which utilizes the aforesaid method and which sequentially injects curing solution into the lean and fat sides of bacon bellies.

For a better understanding of the present invention as well as further objects and features thereof, reference is made to the following detailed description of the invention to be read in conjunction with the accompanying drawings wherein like components in the several views are identified by like reference numerals.

In the drawings:
FIGURE 1 is a side elevation of an injection machine in or on the present invention;
FIGURE 2 is also a side elevation of the injection machine but viewed from the opposite side than in FIGURE 1;
FIGURE 3 is a partial side elevation of the left-hand side of FIGURE 1, various structural members being removed for purposes of clarity;
FIGURE 4 is a cross-section taken on the line 4—4 of FIGURE 3;
FIGURE 5 is a cross-section taken on the line 5—5 of FIGURE 3;
FIGURE 6 is a partial side elevation of the injection machine, the view being similar to the right-hand side of FIGURE 2;
FIGURE 7 is a cross-section taken on the line 7—7 of FIGURE 6;
FIGURE 8 is a top view of a bacon belly illustrating the pattern of injection, the injection holes being greatly enlarged for purposes of illustration;
FIGURE 9 is an end view of the bacon belly illustrating the pattern of injection during the interval that the curing solution is being injected into the fat side of the bacon belly;
FIGURE 10 is also an end view of the bacon belly illustrating the general distribution pattern while the curing solution is being injected into the lean side of the bacon belly;
FIGURE 11 is a longitudinal cross-section of the fat injection nozzle of the machine, and also illustrating the spiral insert therefor;
FIGURE 12 is a vertical cross-section through the header and nozzle of the lean injection portion of the machine;
FIGURE 13 is the insert for the injection nozzle illustrated in FIGURE 12;
FIGURE 14 is a circuit diagram of the electrical timing device for the injection machine of the present invention, and
FIGURE 15 is a front elevational view of the relevant portion of the nozzle which may be used to practice the inventive method.

Referring now to FIGURE 15, there is depicted the relevant portion of a nozzle 80 which may be used to practice the present inventive method. This method is based on the use of a high velocity stream of liquid. The force of such a high velocity stream is great enough to penetrate the surface of the meat product to be treated. Accordingly, the necessity of introducing a needle or similar duct into the meat itself is obviated. The treatment of meat in accordance with this method has been found to result in excellent distribution of liquid within the meat product without any visible degradation of the surface thereof. Since the introduction of a needle into the meat product usually results in tearing the meat ("broken slices"), and thereby degrading it, the present invention represents a considerable advance over the prior art.

The velocities employed in the present method are dependent on a number of variables, such as the nature of the meat product to be treated, the depth of penetration required and the quantity of fluid to be introduced. For example, it has been determined that in the curing of bacon bellies, exit velocities, based on the diameter of the nozzle, of the order of 250 to 500 feet per second are suitable to produce satisfactory impregnation.

As described more fully below, the method is practiced simply by contacting the head of the nozzle or device used to produce the high velocity stream, this being shown by numeral 81 in the nozzle 80 depicted in FIGURE 15, with the meat surface under sufficient pressure to assure the absence of any air space between head 81 and the surface of the meat. Following this step, the liquid is readily introduced into the meat product by forcing it through the nozzle under sufficient pressure to produce the velocity appropriate for the treament desired.

To produce velocities of the order of magnitude necessary to penetrate the meat product being treated, it is necessary to use an orifice or equivalent device, in a thermodynamic sense, to produce the high velocity stream. Nozzle 80, shown in FIGURE 15, which is illustrative of such a device, embodies in essence a conventional "short-pipe orifice." (See Mechanical Engineers Handbook, L. S. Marks, 5th Ed., McGraw-Hill, page 239 et. seq.) The restricted passage 82 in nozzle 80 results in a high velocity liquid stream emanating from the nozzle if the necessary pressure is imposed upstream of passage 82. The pressures necessary to cause high velocities of the order of magnitude recited above may be determined very readily by one skilled in the art (see Mechanical Engineers Handbook, referred to above). In connection with the bacon injection machine to be described more fully below, it has been found that restricted passage 82 is desirably 1/64 of an inch in diameter and 3/32 inch long. Such design when used with an upstream pressure of approximately 2,000 pounds per square inch produces excellent penetration and distribution of liquid within the bacon being treated. Of course, it is to be appreciated that in accordance with thermodynamic principles, the diameter and length of passage 82 may be increased or decreased to provide greater or lesser flow of liquid. It is to be understood that the upstream pressure must also be adjusted to provide the desired stream velocity.

Effective use of a nozzle such as that shown in FIGURE 15 requires that the shape of head 81 be of a certain type of configuration. Thus, it has been found that use of a nozzle having a head 81 which is essentially planar results in air entrainment due to an aspirator effect. Moreover, use of a nozzle having a planar head resulted in inferior penetration and distribution of injected liquid within the meat. At the other extreme, the use of a conical shaped nozzle is undesirable since it has been found that such shape tends to tear or rip the surface tissues of the meat.

For suitable operation, the surface of head 81 should be curved. The curvature may be parabolic, elliptical, hyperbolic or any combination thereof. On the one hand, the radius of curvature of the surface of head 81 is preferably at least equal to or greater than the radius of the shaft 83 of nozzle 80. Referring to FIGURE 15, such radius is equal to $a/2$. At the other extreme, which may be represented, for example, by an elliptical surface, the radius of curvature should be such that the major radius is equal to but not greater than four times the minor radius.

The diameter of the shaft 83 of nozzle 80 is important only in that a small diameter will result in the nozzle piercing the meat surface similar to the prior art injection needle. To avoid the possibility of nozzle 80 puncturing the meat surface, the diameter of shaft 83 should be at least approximately 1/4 inch in diameter and preferably at least 3/8 inch in diameter. The use of nozzles having shaft diameters larger than 3/8 inch is not inherently disadvantageous, but does tend to be uneconomical for obvious reasons.

By reason of its shape, a nozzle having the preferred type of head described above does not break or penetrate the surface of the meat product against which it is pressed. The actual result is that the surface of the meat product is slightly stretched due to compression of the meat by the nozzle. This is best illustrated by reference to FIGURE 9, discussed more in detail below, which illustrates the injection of curing pickle into the fat side of a bacon belly 13.

An important advantage of the present method is the ease with which the fluid introduced into the meat product may be metered. Thus, as is well recognized in the art, the flow rate emanating from an orifice or similar device is very sensitive to changes in pressure drop across the orifice. Accordingly, merely increasing or decreasing the upstream pressure results in a corresponding increase or decrease of liquid flow through, for example, passage 82 of nozzle 80.

As will be described in detail below, embodiment of the principles of the present method in a machine necessitates the use of a plurality of orifice devices for nozzles. By reason of the high upstream pressure at which these orifice devices operate, the presence or absence of meat product in contact with said orifices, has an insubstantial effect on the flow rate emanating therefrom. That is to say, the flow rate emanating from the orifice device is essentially the same whether it is discharging into the atmosphere or discharging into a meat product. As stated above, this feature is a direct result of the high pressure levels at which the orifice devices operate. This is a very important consideration for it simplifies the design of a machine embodying this method in that it is not necessary to assure contact between all orifice devices and the meat product being treated.

Referring now to FIGURES 1 through 7, an injection machine of the present invention utilizing the inventive injection method includes a framework designated in general by the numeral 10. The framework 10 is divided into two stations, a fat injection station identified in general by the numeral 11 and a lean injection station identified in general by the numeral 12. The bacon bellies to be processed, designated in general by the numeral 13, are inserted in the framework 10 first in the fat injection station 11 and are then fed continuously through the framework 10 to the lean injection station 12 in a manner to be presently described.

The framework 10 includes vertical support members 14, 15 and 16 and horizontal support members 17, 18 and 19. Mounted between the vertical support members 14 and 15 are a plurality of stationary rods identified in general by the numeral 20. These rods 20, as illustrated in FIGURES 4 and 5, are preferably fabricated from round metal stock and the number of these rods approximate the width or length of a bacon belly 13 such that as the bacon belly 13 is inserted within the framework 10 it rests on the rods 20. These fixed stationary rods 20, as illustrated in FIGURE 5, are spaced apart a sufficient distance to allow the conveyor rods 21 to move vertically between the stationary rods 20 in a manner and for a purpose to be presently described.

It is to be noted that the lean injection station 12 is in many respects identical to the fat injection station 11. For purposes of simplicity therefor, a similar structure in the lean injection station 12 will be identified by the same numeral as that applied to the structure in the fat injection station 11 but with the addition of the subscript $a$. For example, the stationary rods in the lean injection station are identified by the numeral 20$a$ and are mounted between the vertical support members 15 and 16.

The stationary rods 20$a$ in the lean injection station 12 are therefore in alignment with the stationary rods 20 in the fat injection station and serve solely to support the bacon bellies 13 during their travel through the framework 10. It can therefore be seen that the stationary rods 20 and 20$a$ are in no way contributing to the movement of the bacon bellies 13 through the framework 10.

The movement of the bacon bellies 13 through the framework 10 is accomplished by means of the conveyor rods 21 and 21$a$. These conveyor rods will be described with reference to the fat injection station 11, but it is to be understood that the conveyor rods in the lean injection station 12 are identical.

The conveyor rods 21 as illustrated in FIGURE 3 are generally U-shaped and have their end portions affixed to a horizontal conveyor frame 22. The conveyor frame 33 is generally rectangular in cross-section and is of open construction. Attached to the conveyor frame 22 at spaced positions are vertical support members 23 and 24. These vertical support members 23 and 24 are pivotally connected in an eccentric manner to wheels 25 and 26 respectively. The wheels 25 and 26 are driven in synchronism by the motor reducer 27. This is accomplished as follows: The reducer 27 has attached to the end of its drive shaft a sprocket wheel 28 which in turn drives sprockets 101 and 101$a$ by means of a roller chain 29 as illustrated in FIGURE 1. On the other side of the framework 10 as illustrated in FIGURE 2 are rotatably mounted sprocket wheels 30 and 31. The sprocket wheels 101 and 30 are mounted on a common shaft and in a similar manner wheels 25 and sprocket wheel 31 are mounted on the same shaft. From the foregoing, it can be seen that as motor reducer 27 rotates, wheels 25 and 25$a$ and sprocket wheels 101, 101$a$, 30, 30$a$, 31 and 31$a$ rotate in unison.

It can therefore be seen that since the vertical supports 23 and 24 are connected pivotally and eccentrically to the sprocket wheels 25 and 26, the conveyor frame 22 is moved in a circular path during rotation of these sprocket wheels. The spacing between the top of the conveyor rods 21 and the stationary rods 20 illustrated in FIGURES 1 through 5 is such that during rotary movement of the conveyor frame 22, the conveyor rods 21 alternately move above and then below the level of the stationary rods 20. In this manner as a bacon belly 13 is inserted in the framework 10 on the stationary rods 20 it remains stationary until the conveyor rods 21 move above the level of the stationary rods 20. When this occurs the bacon belly 13 is picked up by the conveyor rods 21 and moved a given length along the stationary rods 20 until the conveyor rods again descend below the level of the stationary rods 20. When this occurs, the bacon bellies come to rest upon the stationary rods 20. This cycle is continually repeated thereby moving the bacon bellies through the framework 10. As illustrated in FIGURES 4 and 5, the conveyor rods 21 are positioned in the conveyor frame 22 in such manner as to pass between the stationary rods 20 during rotary movement of the conveyor frame 22.

During the travel of the bacon belly 13 through the fat injection station 11, curing solution is injected into the fat side of the bacon belly. The manner in which this is accomplished is best illustrated by reference to FIGURES 3, 9 and 11. As illustrated in FIGURE 3, two headers 32 and 33 are provided intermediate the ends of the fat injection station 11. As illustrated in FIGURE 3, the bacon bellies 13 are fed by a conveyor 35 into the fat injection station 11 with the fat side of the bacon belly 13 on the bottom. The bacon belly 13 then progresses through the fat injection station 11 in the manner described until it is positioned above the headers 32 and 33. When this occurs, the spring supported stationary rods 20 above the headers 32 and 33 are depressed a sufficient amount to allow the fat side of the bacon belly 13 to come in contact with the injection nozzles 36 mounted on the headers 32 and 33. When this occurs the nozzles 36 protrude above the rods 20. This is accomplished by means of the movable plate 37 which at the appropriate time is brought into contact with the lean side of the bacon belly 13. This depresses the stationary rods 20 beneath the bacon belly 13 and insures good contact between the fat side of the bacon belly 13 and the injection nozzles 36. The movable plate 37 has attached thereto hairpin connectors 38 which are hooked on the end of the pivotally mounted stationary rods 39. The opposite end of the rods 39 are connected to the pillow block bearings 40. Mounted intermediate the ends of the rods 39 are cam followers 41 which rest on the periphery of cams 42. The cams 42 have mounted on their shaft a sprocket 43 which as illustrated in FIGURE 2 is driven by a roller chain 44. It can therefore be seen that as cams 42 are rotated the periphery of the cams 42 engage the cam followers 41 which are mounted on the rods 39. Since the cams 42 are approximately elliptical, the plate 37 is moved in a near vertical direction.

The cams 42 are so sized and shaped that the movement of the plate 37 is twice as fast as the movement of the conveyor frame 22. The plate 37 therefore makes contact with the lean side of the bacon belly 13 just after the conveyor rods 21 have moved to a position just below the stationary rods 20. In addition, the plate 37 is removed from engagement with the lean side of the bacon belly 13 prior to the time that the conveyor rods 21 move above the stationary rods 20. The rate of travel of the plate 37 is therefore twice as fast as the rate of movement of the conveyor rods 21 between the stationary rods 20. The stationary rods 20 above the headers 32 and 33 are spring biased vertically upward by a pair of springs 34. This insures that the rods 20 will return to their original position after removal of the plate 37.

In order to obtain uniform distribution of the curing pickle in the bacon belly 13, the injection nozzles 36 are spaced at one inch intervals on the headers 32 and 33 and the nozzles on each header are staggered with respect to the nozzles on the other header. This results in the injection pattern illustrated in FIGURE 8. The two headers are preferably spaced three inches apart and if the bacon bellies move two inches between each pumping cycle, curing solution will be injected at one inch intervals. It has been found that this results in a good distribution of the curing solution. It is to be understood that this spacing of the nozzles 36 is merely exemplary and not critical. Such spacing may be varied if desired to obtain the desired injection pattern.

For optimum results with this arrangement, it has been found that passage 45 of the fat injection nozzle 36 should be $\frac{1}{64}$ inch in diameter and $\frac{3}{32}$ inch in length. The discharge of the nozzles 36 may be modified by means of an insert 46. It has been found that with spiral insert 46 illustrated in FIGURE 11, the curing pickle is given a twist which results in better distribution of the curing pickle within the bacon belly. It is to be understood, however, that the satisfactory results are obtained without the necessity of using insert 46.

The lean injection nozzles 47 are similar in design to the fat injection nozzles 36 with the exception of the type of insert. The purpose for this is that with the fat injection nozzles deep penetration and moderate distribution is desired while shallow penetration and wide distribution is desired with the lean injection nozzles. It has been found that better results are obtained with the lean injection nozzles 47 if a solid cylindrical insert 48 is used which has diametrically opposed longitudinal grooves 49 of sufficient size to avoid objectionable back pressure effects. The end of the insert 48 is formed with a recess or well 50 approximately $\frac{1}{8}$ inch deep. A pair of tangential slots 51 connect the well 50 with the grooves 49. In the use of the lean injection nozzles 47 it has been found advisable to provide the nozzles with an extension tube 51 in order to prevent air build-up in the headers 32 and 33 and in order to prevent particles from plugging the nozzle.

The curing solution is stored in tanks (not shown) and fed under pressure to the headers 32, 32a, 33 and 33a. This flow is controlled by the solenoid valves 62 on each header in a manner to be described. It is desirable to use a pressure of approximately 2,000 p.s.i. upstream of nozzles 36 and 47 in order to obtain good penetration.

In the operation of the injection machine of the present invention the bacon bellies 13 are fed into the framework 10 manually or by means of a conveyor or chute 35, the angle of the chute or conveyor 35 exceeding the angle of respose of the bacon bellies 13 in order to insure a continuous end to end or side by side flow of the bacon bellies 13 into the framework 10. Upon entering the fat injection station 11, the bacon bellies repose on the stationary rods 20. At periodic intervals the conveyor rods 21 pass between the stationary rods 20 thereby picking the bacon bellies up and moving them a predetermined distance in the fat injection station 11.

When the bacon bellies 13 are positioned above the fat injection nozzles 36, the plate 37 descends and presses the bacon bellies into firm contact with the injection nozzles 36 and at the same time depressing the spring-supported stationary rods 20. The bacon bellies are then moved in the manner described into the lean injection station 12 where curing solution is injected into the upper or lean portion of the bacon bellies 13. In the lean injection station, instead of the bacon belly being forced into contact with the injection nozzle, the lean injection nozzles 47 are brought into contact with the bacon bellies 13 in the same manner as the plate 37 in the fat injection station 11. The bacon bellies are then discharged from the lean injection station at the end of the framework 10 as illustrated in FIGURE 6 and are ready to be hung for smoking. This may be done immediately since no waiting time is required to allow the curing pickle to disperse throughout the meat.

It is to be noted that the injection machine of the present invention operates in basically two cycles which are 180 degrees out of phase with each other. In the first cycle, the underside or fat portion of the bacon belly 13 is injected with the curing solution and in the second cycle the upper portion or lean portion of the bacon belly 13 is injected with curing solution. The cycles may be reversed if desired. The fat and lean injection cycles are 180 degrees out of phase with each other in order to reduce the load on the motor reducer 27 and on the capacity of the pump delivering curing pickle to the various headers.

Although the two cycles of the machine of the present invention may be reversed, it has been found advantageous to inject curing solution first into the fat side of the bacon belly 13 since saturating the fat side renders it easier for the lean injection nozzles 47 to contact the lean surface of the bacon belly uniformly.

In the event bacon bellies do not come into contact with the various injection nozzles during the injection operation, the unused curing solution falls into a drip pan 52 and may be recovered, filtered and then reused for subsequent injection. In addition, any drippage from bacon bellies is also recovered in a similar manner.

The control means for the automatic machine of the present invention is illustrated in FIGURE 14. A commutator 53 is provided which contains bars or positions 54 which may vary in number, 56 bars being shown for purposes of illustration. A rotating drum 55 is mounted in front of the commutator and has attached thereto a brush 56 which sequentially makes contact with the bars 54 during rotation of the drum 55. The commutator is subdivided into 4 quadrants or sectors with each quadrant being separated by a dead bar. Each quadrant or sector on the commutator 53 regulates the time during which curing solution is injected into the bacon bellies 13 from its respective headers.

In the circuit illustrated in FIGURE 14, the relays 57 and 58 control their respective valves and in turn the flow of curing solution to the fat injection headers 32 and 33 while the relays 59 and 60 control their respective valves and in turn the flow of curing solution to the respective lean injection headers 32a and 33a. The relays 57 and 58 are connected in parallel on one side of the line with the relays 59 and 60. Since the principle of operation for the lean and fat injection headers is the same, only the fat injection operation will be described.

When the rotating brush 56 contacts a bar 54 in a quadrant the circuit from the power source 61 to the relays 57 and 58 is completed. Upon completion of the circuit, the relays 57 and 58 and their associated relays remain energized as long as the revolving brush 56 remains in contact with an energized bar within that quadrant. The solenoid valves 62 mounted on the headers 32 and 33 are connected in series with the contacts on the relays 57 and 58 and are therefore energized at the same time.

Within each quadrant on the drum 55 the duration of the injection cycle may be varied by changing the number of energized bars 54 within each quadrant. This is accomplished by means of the double pole single-throw switches 63, or a double pole multi-position continually shorting switch. It is to be noted that each quadrant controls one header and therefore one switch, simultaneously varies the time cycle of both quadrants of the fat or lean injection headers.

What has been described is a method for introducing liquid into a meat product which obviates the necessity of penetrating the surface of the meat product with a needle or similar device. In the illustrative example described above, to provide a more thorough understanding of the principles underlying the inventive method, a "short-pipe orifice" was used to furnish the high velocity stream. It is to be understood that such device was intended merely as exemplary of the general class of devices which may be employed to practice the inventive method.

Also described abaove is an automatic injection machine which utilizes the inventive method.

It is to be appreciated that both the method and the machine my be modified by one skilled in the art without departing from the spirit and scope of this invention.

We claim:

1. An injection machine for automatically impregnating meat slabs with a curing liquid by means of a jet stream comprising a work chamber, a fixed trackway constituted by a plurality of longitudinally extending rails positioned within said chamber and spaced in parallel relationship, means for feeding slabs of meat into said chamber onto the input end of said trackway, a series of meat advancing mechanisms disposed at spaced positions below said trackway, each mechanism including a bank of parallel rods disposed in intermeshing relationship with the rails of said trackway, and means to oscillate said banks in a vertical and substantially circular plane to cause said rods to cyclically rise above and below said rails and thereby advance said slabs through said chamber, and an injection station positioned on said trackway intermediate adjacent advancing mechanisms thereof, said station including injection nozzles positioned to engage a face of the meat slab positioned on said trackway, a pressure plate positioned to engage the other face of the meat slab, and means to oscillate said pressure plate cyclically to engage said other face and to retract therefrom, said last-named means operating in phase opposition to the oscillation of said advancing mechanism whereby when the pressure plate is brought downwardly the slab thereunder is stationary and the plate urges said slab against said nozzles to effect the desired injection.

2. An injection machine for automatically impregnating the lean and fat sides of meat slabs with a curing liquid by means of a jet stream comprising a work chamber, a fixed trackway positioned within said chamber, said trackway being constituted by a plurality of longitudinally extending rails spaced in parallel relationship, means for feeding slabs of meat into said chamber onto the input end of said trackway, a series of meat advancing mechanisms disposed at spaced positions below said trackway, each mechanism including a bank of parallel rods disposed in intermeshing relationship with the rails of said trackway, and means to oscillate said banks in a vertical and substantially circular plane to cause said rods to cyclically rise above and below said rails and thereby advance said slabs through said chamber, and fat and lean injection stations positioned on said trackway intermediate adjacent advancing mechanisms thereof, said fat injection station including injection nozzles positioned to engage the fat side of the meat slab positioned on said trackway, a pressure plate positioned to engage the other face of the meat slab, means to oscillate said pressure plate cyclically to engage said other face and to retract therefrom, said last named means operating in phase opposition to the oscillation of said advancing mechanism whereby when the pressure plate is brought downwardly the slab thereunder is stationary and the plate urges said slab against said nozzles to effect the desired injection into the fat side of said meat slabs, said lean injection station including injection nozzles positioned to engage the lean side of the meat slab positioned on said trackway, means to oscillate said lean injection nozzles in a vertical plane in phase opposition to the oscillation of said advancing mechanism whereby when the lean injection nozzles are brought into contact with the slab the slab is stationary and the desired injection is effected.

3. An injection machine for automatically impregnating the lean and fat sides of meat slabs with a curing liquid by means of a jet stream comprising a work chamber divided into fat and lean injection stations, a fixed trackway positioned within said chamber and being constituted by a plurality of longitudinally extending rails spaced in parallel relationship, means for feeding slabs of meat into said chamber onto the input end of said trackway, a series of meat advancing mechanisms disposed at spaced positions below said trackway, each mechanism including a bank of parallel rods disposed in intermeshing relationship with the rails of said trackway, and means to oscillate said banks in a vertical and substantially circular plane to cause said rods to cyclically rise above and below said rails and thereby advance said slabs through said chamber, said fat and lean injection stations being positioned on said trackway intermediate adjacent advancing mechanisms thereof, said fat injection station including injection nozzles positioned to engage a face on the meat slab positioned on said trackway, a pressure plate positioned to engage the other face of the meat slab, and means to oscillate said pressure plate cyclically to engage said other face and to retract therefrom, said last-named means operating in phase opposition to the oscillation of said advancing mechanism whereby when the pressure plate is brought downwardly the slab thereunder is stationary and the plate urges said slab against said nozzles to effect the desired injection into the fat side of said meat slabs, said lean injection station including injection nozzles positioned to engage the lean side of the meat slab positioned on said trackway, means to oscillate said lean injection nozzles in a vertical plane in phase opposition to the oscillation of said advancing mechanism whereby when the lean injection nozzles are brought into contact with the slab the slab is stationary and the desired injection is effected.

4. An injection machine for automatically impregnating the lean and fat sides of meat slabs with a curing liquid by means of a jet stream comprising a work chamber divided into fat and lean injection stations disposed at spaced positions between the input and output ends of said chamber, a fixed trackway positioned within said chamber and being constituted by a plurality of longitudinally extending rails spaced in parallel relationship, means for feeding slabs of meat into said chamber onto the input end of said trackway with the fat side of said slab in engagement with said trackway, a meat advancing mechanism at each station disposed below said trackway, each mechanism including a carriage having mounted thereon a series of spaced parallel rods disposed in intermeshing relationship with the rails of said trackway, and means to oscillate said carriages in a vertical and substantially circular plane to cause said rods on said carriages to cyclically rise above and below said rails and thereby advance said slabs through said stations and said chamber, said lean and fat injection stations being positioned on said trackway intermediate adjacent advancing mechanisms thereof, said lean injection station including injection nozzles positioned to engage the lean side of the meat slab positioned on said trackway, means to oscillate said lean injection nozzles in a vertical plane in phase opposition to the oscillation of the meat advancing mechanism at said lean injection station whereby when the lean injection nozzles are brought into contact with the slab of meat the slab is stationary and the desired injection is effected, said fat injection station including injection nozzles positioned to engage the fat side of the meat slab positioned on said trackway, a pressure plate positioned to engage the lean face of the meat slab, means to oscillate said pressure plate cyclically to engage the lean side of said slab and to retract therefrom, said last-named means operating in phase opposition to the oscillation of the meat advancing mechanism at said fat injection station whereby when the pressure plate is brought downwardly the slab thereunder is stationary and the plate urges said slab against said nozzles to effect the desired injection into the fat side of said meat slabs.

5. An injection machine for automatically impregnating the lean and fat sides of meat slabs with a curing liquid by means of a jet stream comprising a work chamber divided into fat and lean injection stations disposed at spaced positions between the input and output ends of said chamber, a fixed trackway positioned within said chamber and being constituted by a plurality of longitudinally extending rails spaced in parallel relationship, means for feeding slabs of meat into said chamber onto the input end of said trackway with the fat side of said slab in engagement with said trackway, a meat advancing mechanism at each station disposed below said trackway, each mechanism including a carriage having mounted thereon a series of spaced banks of parallel rods disposed in intermeshing relationship with the rails of said trackway, and means to vertically oscillate said carriages in a substantially circular plane to cause said rods on said carriages to cyclically rise above and below said rails and thereby advance said slabs through said stations and said chamber, said lean and fat injection stations being positioned on said trackway intermediate adjacent advancing mechanisms thereof, said lean injection station including injection nozzles positioned above said trackway and adapted to engage the lean side of the meat slab positioned above said trackway, means to oscillate said lean injection nozzles in a vertical plane in phase opposition to the oscillation of the meat advancing mechanisms at said lean injection station whereby when the lean injection nozzles are brought into contact with the slab of meat the slab is stationary and the desired injection is effected, said fat injection station including injection nozzles positioned below said trackway and adapted to engage the fat side of the meat slab positioned on said trackway, a pressure plate positioned to engage the lean face of the meat slab, means to oscillate said pressure plate cyclically to engage the lean side of said slab and to retract therefrom, said last named means operating in phase opposition to the oscillation of the meat advancing mechanism at said fat injection station whereby when the pressure plate is brought downwardly the slab thereunder is stationary and the plate urges said slab against said nozzles to effect the desired injection into the fat side of said meat slabs, and means to supply curing solution to said nozzles when said nozzles are in contact with said meat slab.

6. An injection machine for automatically impregnating the lean and fat sides of meat slabs with a curing liquid by means of a jet stream comprising a work chamber divided into fat and lean injection stations disposed at spaced positions between the input and output ends of said chamber, a fixed trackway positioned within said chamber and being constituted by a plurality of longitudinally extending rails spaced in parallel relationship, means for feeding slabs of meat into said chamber onto the input end of said trackway with the fat side of said slab in engagement with said trackway, a meat advancing mechanism at each station disposed below said trackway, each mechanism including a carriage having mounted thereon two spaced banks of parallel rods disposed in intermeshing relationship with the rails of said trackway, and means to oscillate said carriages in a vertical and substantially circular plane to cause said rods on said carriages to cyclically rise above and below said rails and thereby advance said slabs through said stations and said chamber, said carriages being operated in phase opposition whereby when the rods on one carriage are above said rails the rods on the other carriage are below said rails, said lean and fat injection stations being positioned on said trackway intermediate the adjacent advancing mechanisms thereof, said lean injection station being positioned above said rails and including injection nozzles positioned to engage the lean side of the meat slab positioned on said trackway, means to oscillate said lean injection nozzles in a vertical plane in phase opposition to the oscillation of the meat advancing mechanisms at said lean injection station whereby when the lean injection nozzles are brought into contact with the slab of meat the slab is stationary and the desired injection is effected, said fat injection station being positioned below said rails and including injection nozzles positioned to engage the fat side of the meat slab positioned on said trackway, a pressure plate positioned to engage the lean face of the meat slab, means to oscillate said pressure plate cyclically to engage the lean side of said slab and to retract therefrom, said last named means operating in phase opposition to the oscillation of the meat advancing mechanism at said fat injection station whereby when the pressure plate is brought downwardly the slab thereunder is stationary and the plate urges said slab against said nozzles to effect the desired injection into the fat side of said meat slabs, and means to supply curing liquid to said nozzles.

7. An injection machine in accordance with claim 6 wherein the ends of the fat and lean injection nozzles that contact the meat slab are cylindrical whereby the nozzles do not penetrate the surface of the meat slab upon engagement therewith but compress and stretch the surface of the slab to effect better penetration and distribution of curing liquid therein.

8. An injection machine in accordance with claim 7 wherein said fat injection nozzle has positioned therein a spiral insert in order to effect deep penetration and moderate distribution of curing solution within the fat portion of said meat slab.

9. An injection machine in accordance with claim 8 wherein said lean injection nozzle has positioned therein a solid cylindrical insert, said insert having diametrically opposed longitudinal grooves on the surface thereof and a recess in the end thereof adjacent the cylindrical end of said nozzle, said grooves being connected to said recess by tangential troughs whereby shallow penetration and wide distribution of curing solution is obtained in the lean side of said meat slabs.

10. An automatic injection machine in accordance with claim 6 wherein said injection nozzles are mounted at spaced positions on headers, each of said stations having associated therewith two headers spaced in parallel relation, and the nozzles on each header at each station being staggered with respect to the nozzles on the other header at said station.

11. An automatic injection machine in accordance with claim 7 wherein the headers at each station are spaced apart three inches and the nozzles on each header are spaced apart one inch.

References Cited in the file of this patent

UNITED STATES PATENTS

| | | |
|---|---|---|
| 2,466,772 | Kenjon | Apr. 12, 1949 |
| 2,528,204 | Zwosta | Oct. 31, 1950 |
| 2,602,561 | Carter | July 8, 1952 |
| 2,645,172 | Allbright et al. | July 14, 1953 |
| 2,663,247 | Hensgen et al. | Dec. 22, 1953 |
| 2,704,542 | Scherer | Mar. 22, 1955 |
| 2,821,901 | Abrams | Feb. 4, 1958 |
| 2,854,342 | Homarik | Sept. 30, 1958 |